May 24, 1966  H. HUBER ET AL  3,252,838
FUEL CELL HAVING ROTATABLE ELECTRODE
Filed Jan. 12, 1962
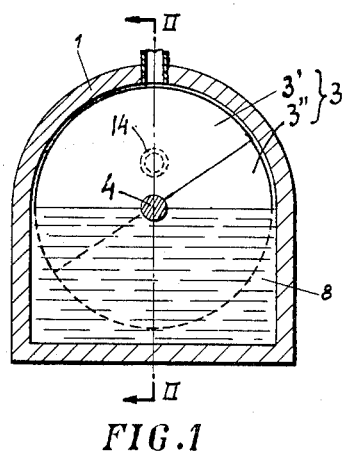
FIG.1
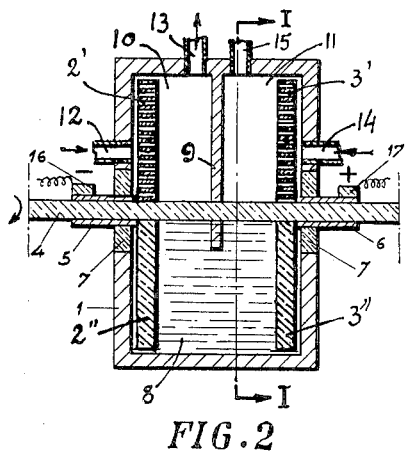
FIG.2
FIG.3
FIG.4
FIG.5
FIG.6
FIG.7
INVENTORS:
H. HUBER et R. LE BIHAN
BY Paul M. Craig, Jr.
ATTORNEY United States Patent Office 3,252,838
Patented May 24, 1966

3,252,838
FUEL CELL HAVING ROTATABLE ELECTRODE
Harry Huber and Raymond Le Bihan, Paris, France, assignors to CSF-Compagnie Generale De Telegraphie Sans Fil, Paris, France
Filed Jan. 12, 1962, Ser. No. 165,781
Claims priority, application France, Jan. 27, 1961, 850,917
9 Claims. (Cl. 136—86)

The present invention relates to electro-chemical cells, known under the name of fuel cells.

It is known in the prior art that the fuel cell batteries are formed of cells each comprising a positive electrode and a negative electrode, separated by an ion conductor, for example, an electrolyte in solution, these elements being constituted by appropriate materials to permit transformation of the chemical energy directly into electrical energy by the oxidation of the positive electrode and the reduction of the negative electrode.

For that purpose, the negative electrode is constituted by a combustible material such as, for example, carbon or a material supplied with combustible gas, for example, hydrogen, whereas the positive electrode is constituted by an oxidizing material, for example, metal oxides or a material supplied with a combustive gas, for example, oxygen or air.

Within one of the known constructions of cells provided with a liquid electrolyte and with electrodes fed with gas, the electrodes, of circular form, are taken along in a rotary movement with the aid of an auxiliary motor. Each point of the electrodes finds itself submerged during one-half of the time within the liquid electrolyte, normally within the lower portion of the fuel cell and during the other half of the period of time exposed to the feed gas supplied within the upper portion of the fuel cell. This arrangement, as is known, increases the output of the fuel cell by reason of the fact that it permits the gas to be adsorbed along the relatively dry portion of the electrode which takes along thereafter the adsorbed gas into the liquid electrolyte thereby intensifying the chemical reaction which generates the electric current.

However, the fuel cells provided with rotating electrodes of this type produce direct current, exactly as if the electrodes were immovable.

The present invention has for its object a fuel cell with rotary electrodes which produces a current of which the intensity varies periodically between a maximum value and a minimum value such as zero which permits the use of voltage step-up transformers for the conveyance of the electrical energy and offers for certain applications important advantages.

Accordingly, it is an object of the present invention to provide a fuel cell of the type mentioned hereinabove which is capable of directly producing alternating-current electrical energy.

It is another object of the present invention to provide a fuel cell which is sturdy and simple in structure, and which has a relatively large output of alternating-current voltage.

Still a further object of the present invention resides in the provision of a fuel cell having rotary electrodes which are so arranged and constructed as to produce an alternating current output, utilizing in a most favorable manner the supply of the feed gases passing through the electrode structures of the cell.

These and other objects, features and advantages of the present invention will become more obvious from the following description when taken in connection with the accompanying drawing which shows, for purposes of illustration only, several embodiments in accordance with the present invention, and wherein—

FIGURE 1 is a cross sectional view through a first embodiment of a fuel cell having electrodes constructed in accordance with the present invention, the cross section being taken along line I—I of FIGURE 2;

FIGURE 2 is a cross sectional view taken along line II—II of FIGURE 1;

FIGURE 3 is a diagram indicating the output obtainable with the fuel cell of FIGURES 1 and 2;

FIGURE 4 is a schematic elevational view of a modified embodiment of an electrode structure for use with a fuel cell in accordance with the present invention;

FIGURE 5 is a diagram illustrating the output obtainable with a fuel cell provided with the electrode structure of FIGURE 4;

FIGURE 6 is a schematic elevational view of still a further modified embodiment of an electrode structure for use with a fuel cell in accordance with the present invention, and FIGURE 7 is a diagram showing the output obtainable with the electrode structure of FIGURE 6.

According to the present invention, the fuel cell battery provided with rotating electrodes is characterized by the following features, taken separately or in combination:

(1) Each cell of the battery comprises two circular plates, movable about a common axis, and each comprising at least one electrode in the form of a sector extending over an angle of 180° maximum, and an equal number of sectors of insulating material, the electrodes being all positive on one of the plates and negative on the other.

(2) The electrodes, supplied with gas, are porous and the pores are preferably straight and regular.

(3) The evacuation of the gases takes place at a lower pressure than that of the input thereof.

Referring now to the drawing wherein like reference numerals are used throughout the various views to designate corresponding parts, and more particularly to FIGURES 1 and 2 thereof, reference numeral 1 designates therein a metallic tight enclosure of which the upper wall forms a semi-cylinder. Two plates 2 and 3, which are provided within the enclosure 1 and are separated from the adjacent cylindrical wall by a very small play, are secured to a movable arbor or shaft 4 made of insulating material.

The two plates 2 and 3 have each an active half 2' and 3' forming the electrode and made of porous material and an inactive half 2" and 3" made of insulating material. The electrode portions 2' and 3' constantly and rigorously face each other, and the pores of these portions are preferably straight and regular.

The arbor or shaft 4 traverses the walls of the enclosure 1 by passing through the inside of metallic sleeves 5 and 6, secured respectively to the electrodes 2' and 3', and insulated from the metal of the enclosure 1 with the aid of insulating pieces 7.

The lower half of the enclosure 1 is filled with a liquid electrolyte 8 whereas there are provided within the upper portion of the enclosure 1 two gas chambers 10 and 11, separated from each other by a partition wall 9, of which the first chamber is a chamber with a combustible medium and the second chamber a chamber with a combustible medium, that is, with an oxidizing medium.

The gas chambers 10 and 11 are provided with input and output nipples, namely with input and output nipples 12 and 13 for the first gas chamber 10 and with input and output nipples 14 and 15 for the second chamber 11. Similarly, appropriate nipples, not shown, are provided to supply and remove the electrolyte 8.

Furthermore, stationary brushes 16 and 17 which are in sliding engagement with the movable cylinders 5 and 6, constitute the two poles + and − of the cell.

Operation

During operation, the shaft 4, driven by an auxiliary motor of any suitable construction (not illustrated) drives or takes along in its rotary movements the porous electrodes 2' and 3'. Consequently, the porous electrodes 2' and 3' pass alternately through the gas chambers and the electrolyte. By establishing on the side of the evacuation of the gases a lower pressure than that at the input side thereof, it is possible to pass the gases through all of the pores of the electrodes which produces a drying of the wetted pores moistened by the electrolyte and the adsorption of the gases along the surface of the pores. The gases adsorbed on the electrodes are taken along into the electrolyte, and reactions are produced by the contact of the electrolyte with the immersed electrodes, namely oxidation of the positive electrode and reduction of the negative electrode. The electrolyte recombines the positive and negative ions, formed at the two electrodes, and a current circulates when the external circuit is closed by connecting a load across the positive and negative terminals.

The intensity of the current produced varies with the immersed surface of the electrodes, and FIGURE 3 shows the outline of the curve I (t), giving the intensity I as a function of time t, for electrodes subtending an arc of 180° as shown in FIGURES 1 and 2.

It may be readily seen that the intensity of the current varies periodically between zero and a maximum value during the corresponding period for a complete rotation of the electrodes or of the shaft 4 about the respective axis thereof.

The modified embodiment illustrated in FIGURE 4 consists of disposing on the shaft plates comprising each two electrodes 22 and 23 of the same type, insulated from each other by insulating sectors 24 and 25.

Each cell comprises two plates with two positive electrodes on one plate and two negative electrodes on the other plate, the electrodes of opposite polarity facing one another rigorously. Two variable current sources are obtained thereby, shifted with respect to one another by a half-period, wherein the removal of the current takes place with the aid of metallic segments 26 and 27 fixed to the electrodes.

FIGURE 5 illustrates the outline of the current variations obtainable with this embodiment, the two currents obtained thereby being shown, respectively, in full line and dash lines.

In the embodiment of FIGURE 6, each plate has been subdivided into three electrodes 31, 32 and 33 of the same polarity, separated from each other by insulating sectors 34, 35 and 36. Two plates thus arranged furnish therefore within one and the same cell three current sources shifted with respect to each other by a third of a period, under the condition, well understood, that the electrodes of opposite polarity are disposed rigorously facing each other on the two plates. The current is removed with the aid of metallic segments 37, 38 and 39 and FIGURE 7 illustrates, respectively, in full line, dash line and dotted lines the three currents produced thereby.

While we have shown and described several embodiments in accordance with the present invention, it is understood that the same is not limited thereto, but is susceptible of many changes and modifications as known to a person skilled in the art. For example, in all of the embodiments illustrated, the form of the electrodes may be so modified and designed as to impart to the current curves an outline more or less approaching sinusoidal shape.

Thus, it is obvious that the present invention is susceptible of many changes and modifications within the spirit and scope thereof, and we therefore do not wish to be limited to the details shown and described herein, but intend to cover all such changes and modifications as are encompassed by the scope of the appended claims.

We claim:
1. A fuel cell comprising a liquid electrolyte bath, two plates partially immersed in said electrolyte, said plates being adapted to turn about a common axis, each plate comprising at least one sector-shaped electrode, extending over an angle of 180° maximum, and an equal number of insulating sectors alternating with said electrodes, the electrodes of one plate being substantially in registry with those of the other plate, means for supplying gaseous fuel and oxidizing gas to said plates, and means for picking up electrical energy across each pair of opposite electrodes on said plates.

2. A fuel cell comprising a liquid electrolyte bath, two circular plates, spaced apart and partially immersed in said electrolyte, said plates being adapted to turn about a common axis, each plate comprising at least one sector-shaped electrode, extending over an angle of 180° maximum, and an equal number of insulating sectors alternating with said electrodes, the electrodes of one plate being substantially in registry with those of the other plate, means for supplying gaseous fuel and evacuating the same on opposite sides of one plate, respectively, means for supplying oxidizing gas and evacuating the same on opposite sides of the other plate, respectively, and means for picking up electrical energy across each pair of opposite electrodes on said two plates.

3. A fuel cell comprising a liquid electrolyte bath, two circular plates, spaced apart and partially immersed in said electrolyte, said plates being adapted to turn about a common axis, each plate comprising at least one sector-shaped porous electrode, extending over an angle of 180° maximum, and an equal number of insulating sectors alternating with said electrodes, the electrodes of one plate being substantially in registry with those of the other plate, means for supplying gaseous fuel and evacuating the same on opposite sides of one plate, respectively, means for supplying oxidizing gas and evacuating the same on opposite sides of the other plate, respectively, and means for picking up electrical energy across each pair of opposite electrodes on said two plates.

4. A fuel cell comprising a liquid electrolyte bath, two circular plates, spaced apart and partially immersed in said electrolyte, said plates being adapted to turn about a common axis, each plate comprising at least one sector-shaped porous electrode, extending over an angle of 180° maximum, and an equal number of insulating sectors alternating with said electrodes, the electrodes of one plate being substantially in registry with those of the other plate and said electrodes being provided with substantially rectilinear and regular pores, means for supplying gaseous fuel and evacuating the same on opposite sides of one plate, respectively, means for supplying oxidizing gas and evacuating the same on opposite sides of the other plate, respectively, and means for picking up electrical energy across each pair of opposite electrodes on said two plates.

5. A fuel cell comprising a liquid electrolyte bath, two circular plates, spaced apart and partially immersed in said electrolyte, said plates being adapted to turn about a common axis, each plate comprising at least one sector-shaped porous electrode, extending over an angle of 180° maximum, and an equal number of insulating sectors alternating with said electrodes, the electrodes of one plate being substantially in registry with those of the other plate and said electrodes being provided with substantially rectilinear and regular pores, means for supplying gaseous fuel and evacuating the same on opposite sides of one plate, respectively, means for supplying oxidizing gas and evacuating the same on opposite sides of the other plate, respectively, means for maintaining a higher pressure on the side of each plate on which the respective gaseous medium is supplied than on the side thereof on which the gaseous medium is evacuated therefrom, and means for picking up electrical energy across each pair of opposite electrodes on said two plates.

6. In a fuel cell provided with a liquid electrolyte bath and having plate means, adapted to be immersed in said electrolyte during rotation thereof, means for supplying gaseous fuel and oxidizing gas to said plate means, and output means for deriving electrical energy from said fuel cell for use with an external load, the improvement essentially consisting of an electrode structure comprising said plate means so constructed and arranged as to produce alternating-current electrical energy at said output means during rotation of said plate means.

7. A fuel cell comprising a liquid electrolyte bath, two plates, spaced apart and partially immersed in said electrolyte, said plates being adapted to turn about a common axis, each plate comprising at least one sector-shaped porous electrode, and an equal number of insulating sectors alternating with said electrodes, the electrodes of one plate being substantially in registry with those of the other plate and said electrodes being provided with substantially rectilinear and regular pores, means for supplying gaseous fuel and evacuating the same on opposite sides of one plate, respectively, means for supplying oxidizing gas and evacuating the same on opposite sides of the other plate, respectively, and means for picking up electrical energy across each pair of opposite electrodes on said two plates.

8. A fuel cell comprising a liquid electrolyte bath, plate means spaced apart and partially immersed in said electrolyte, said plate means being adapted to rotate, each plate means comprising at least one sector-shaped electrode and an insulating sector, means for supplying gaseous fuel and oxidizing gas to said plate means, and output means to enable extraction of electrical energy from said electrodes.

9. A fuel cell of the type including a liquid electrolyte bath, two circular plates partially immersed in said electrolyte and adapted to turn about a common axis, means for supplying gaseous fuel and evacuating the same on two opposite sides of one plate, respectively, and means for supplying oxidizing gas and evacuating the same on two opposite sides of the other plate, respectively, wherein each plate comprises sector-shaped portions made up, alternately, of electrode forming material and of insulating material, the electrode sectors of one plate being substantially in registry with those of the other plate, whereby variable currents are provided across each pair of opposite electrode sectors on said two plates.

References Cited by the Examiner
UNITED STATES PATENTS
411,426   9/1889   Dahl _____ 136—86
FOREIGN PATENTS
27,166   5/1924   French.
152,364   2/1922   Great Britain.

WINSTON A. DOUGLAS, *Primary Examiner.*

JOHN R. SPECK, *Examiner.*